United States Patent

Youtz et al.

[15] 3,696,454
[45] Oct. 10, 1972

[54] THREAD CUTTING DIE HEAD

[72] Inventors: Donald E. Youtz; Edwin M. Eigenbrode, both of Waynesboro, Pa.

[73] Assignee: Teledyne, Inc., Los Angeles, Calif.

[22] Filed: Sept. 10, 1970

[21] Appl. No.: 70,995

[52] U.S. Cl. ...................10/95, 408/148, 408/153, 408/158
[51] Int. Cl. ............................B23g 1/00, B23g 5/10
[58] Field of Search ..10/95, 111, 120; 408/148, 149, 408/153, 154, 158, 172

[56] References Cited

UNITED STATES PATENTS

| 1,639,712 | 8/1927 | Strickland | 408/148 |
| 2,082,757 | 6/1937 | Reimschissel | 408/148 |
| 2,739,322 | 3/1956 | Reimschissel et al. | 408/148 |

*Primary Examiner*—Charles W. Lanham
*Assistant Examiner*—E. M. Combs
*Attorney*—Strauch, Nolan, Neale, Nies & Kurz

[57] ABSTRACT

A thread cutting die head incorporating a mechanism permitting the cutting tools (chasers) to be replaced quickly without demounting the head or major disassembly of the head and without disturbing the basic setting of the head.

2 Claims, 5 Drawing Figures

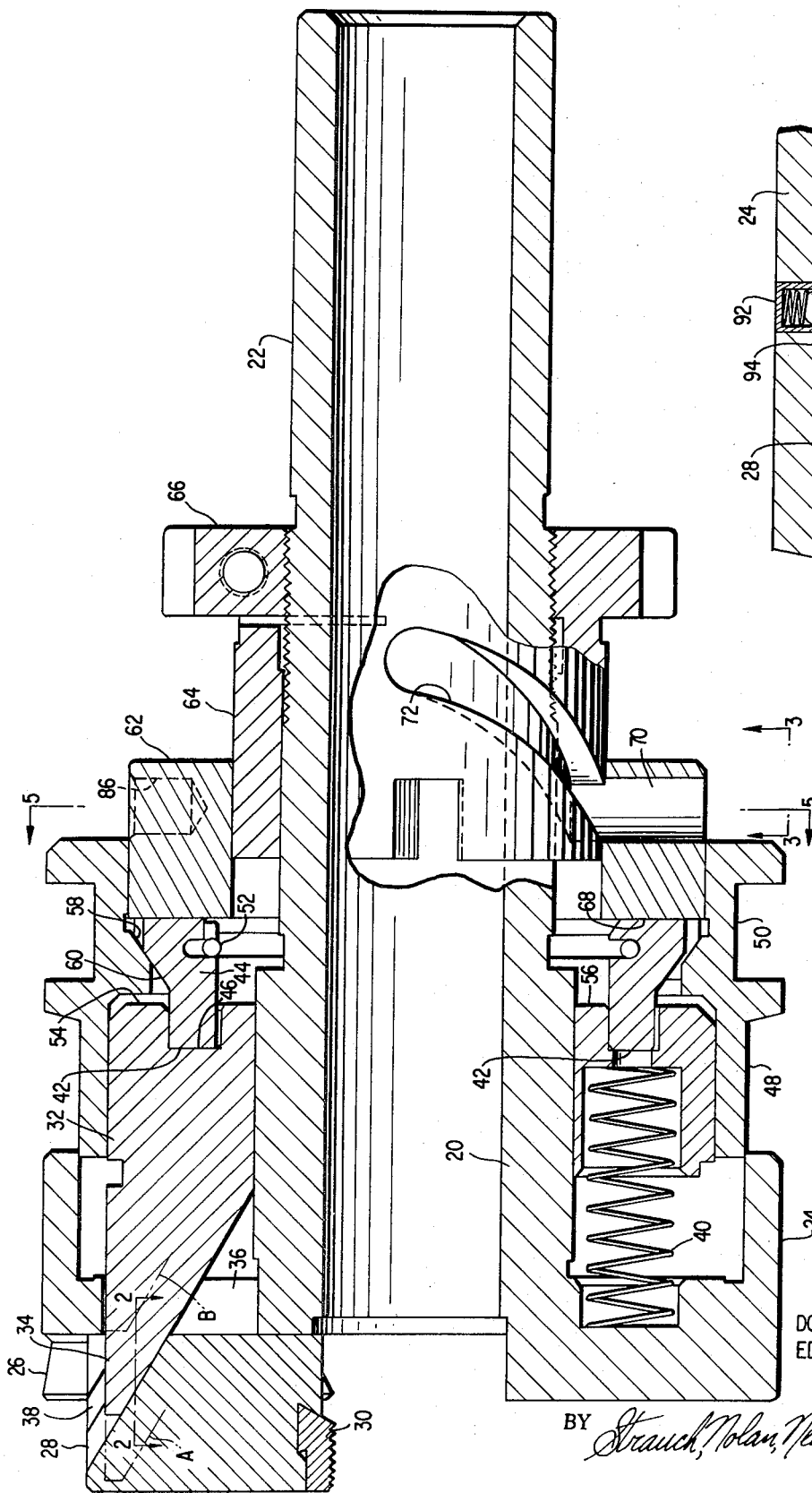

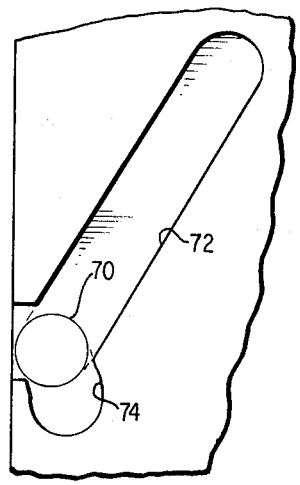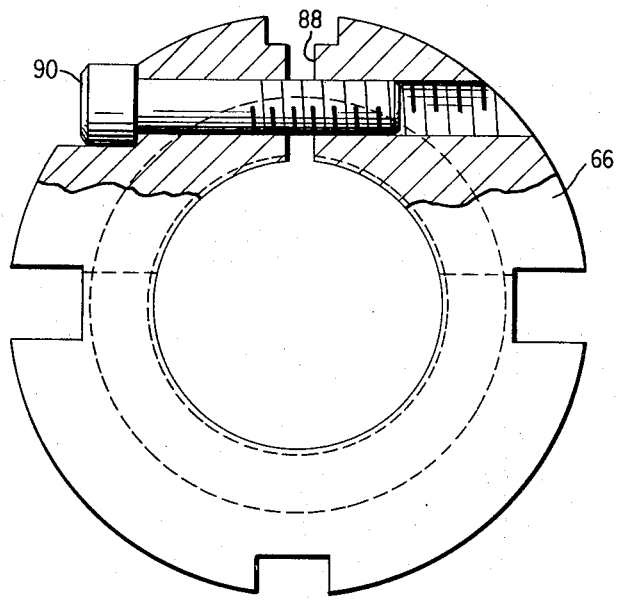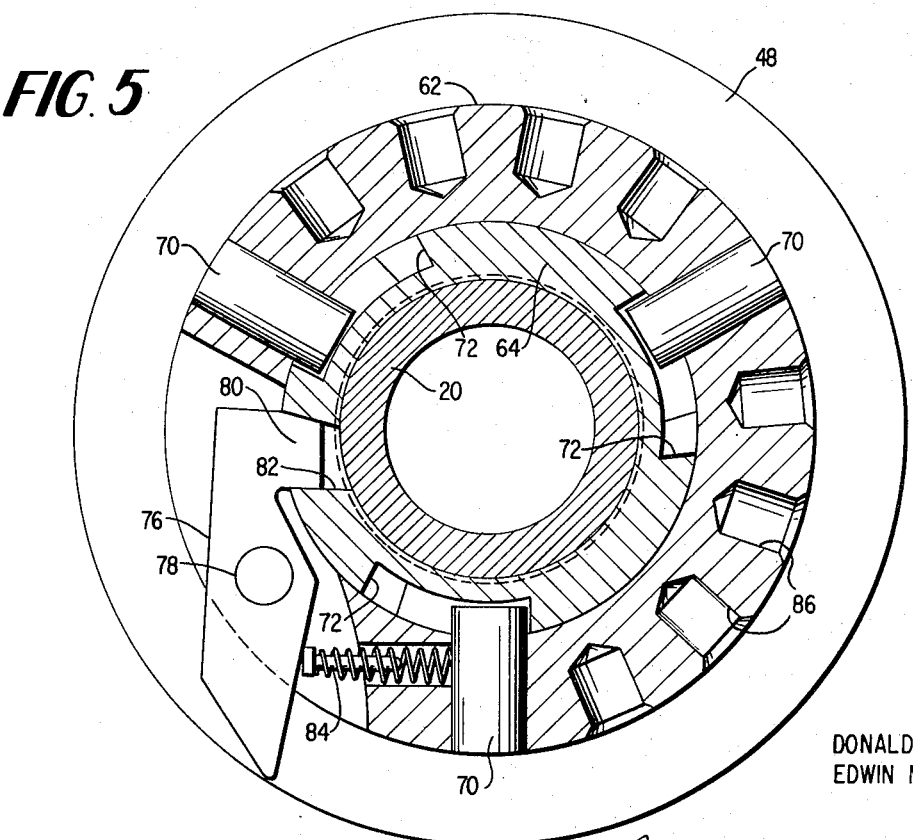

THREAD CUTTING DIE HEAD

BACKGROUND OF THE INVENTION

The present invention is an improvement over the self-opening die head disclosed and claimed in U.S. Pat. No. 2,739,322 granted Mar. 27, 1956 to applicant's assignee.

In a die head of this general type thread cutting chasers are mounted in chaser holders which are automatically moved radially of the head between open and closed positions. Usually four such chasers and chaser holders are employed in this type of head. The chaser holders are generally adapted for use in the threading of a small range of workpieces although the die head itself is capable of accommodating a relatively wide range of workpiece sizes. Accordingly, it is necessary to replace the chaser holders as well as the chasers when the workpiece size is changed sufficiently. Also, when the chasers become worn and require replacement, it is quite difficult to install new chasers and set them with the required precision and generally replacement of the worn chasers is effected by installing a replacement set of chaser holders with the new chasers in preset position.

In a die head of the construction shown in the prior U.S. Pat. No. 2,739,322 it is usually necessary to remove the entire die head from the machine in which it is installed and then disassemble the head to permit removal and replacement of the chaser holders. Since the die head is usually a component of a larger machine or performs one machining operation in a series of automatically scheduled operations, the down time of the entire machine occasioned by removal of the head is usually quite costly.

SUMMARY OF THE INVENTION

It is the principal purpose and object of the present invention to provide improved thread cutting die heads which facilitate replacement of the chaser holders without requiring removal of the die head from the apparatus with which it is associated and without requiring special tools or techniques.

It is also an object of the present invention to provide improved die heads incorporating means for effecting quick change of the chaser holders while retaining the structural rigidity and the desirable performance characteristics afforded by prior die heads.

It is a further object of the present invention to provide improved die heads incorporating means for quickly changing the chaser holders without substantially increasing the cost or complexity of the die head.

In die heads of this general type the chaser holders are moved along radial guideways in the die head by a closing ring movable axially of the die head. In one limit of axial travel the closing ring holds the chaser holders in die-closed or operating position. In the other limit of axial travel, to which the closing ring is moved by relatively heavy springs, the closing ring holds the chaser holders in open position with the chasers removed from the workpiece. The closing ring is held in each limit position by a latch mechanism and back-up structure. To remove the chaser holders it has been necessary to remove the back-up structure and the latch mechanism to permit the closing ring to move to a third axial position beyond its normal limits.

In accordance with the present invention a unique structure is provided which normally limits the movement of the closing ring between the usual open and closed positions but, which, by manipulation of a single externally accessible part, selectively permits the displacement of the closing ring to a third position which releases the chaser holders for removal and replacement.

Additional objects and advantages will become apparent as the description proceeds.

THE DRAWINGS

FIG. 1 is a central vertical section through a die head incorporating the present invention, showing the head in open position;

FIG. 2 is a fragmentary section taken along line 2—2 of FIG. 1;

FIG. 3 is a fragmentary elevation of the apparatus of FIG. 1 looking in the direction of the arrows FIG. 3—3 of FIG. 1;

FIG. 4 is an end elevation partly in section of one component of the die head shown separately; and FIG. 5 is a transverse section taken along line 5—5 of FIG. 1.

DESCRIPTION OF PREFERRED EMBODIMENT

Referring now more particularly to the drawings, the die head includes a head body 20 having at one end a shank 22 adapted to fit the machine tool spindle in which the die head is mounted. At its opposite or forward end, the head body 20 has an enlarged portion 24 provided with a plurality of dove-tailed slideways 26 in which the chaser holders 28 are mounted for sliding movement radially of the head body. Tangential chasers 30 are adjustably secured in the holders 28 by conventional means.

The radial position of the chaser holders 28 is effected by a closing ring 32 mounted for axial sliding movement on the head body. At its forward end the closing ring 32 is provided with forwardly projecting prongs 34, one for each of the four chaser holders, which extend through openings 36 into slideways 26. As more fully explained in U.S. Pat. No. 2,739,322, the prongs 34 of the closing ring and the chaser holders 28 are formed with inclined cam guideways 38 which are so arranged that axial movement of the closing ring produces radial movement of the chaser holders for moving the chaser holders into or out of thread cutting position or for adjusting the cutting position to various work diameters within the range of the chaser holders.

FIG. 1 illustrates the position of the parts when the die head is open, a position to which the closing ring is constantly urged by a plurality of springs 40 compressed between the forward portion of the die head body and the adjacent portion of the closing ring 32. The limit position of the closing ring is determined by a pair of abutments 42 formed on latch ring 44, the abutments engaging the bottom of an annular groove 46 in the rear face of the closing ring 32.

The die head is opened and closed by an operating ring 48 having a peripheral groove 50 for engagement by the usual yoke, not shown, for shifting the operating ring axially between the retracted position shown and an advanced position to displace the closing ring to the left as viewed in FIG. 1 to the dotted line position A, which is the die-closed position. As more fully explained in U.S. Pat. No. 2,739,322 when the closing ring 32 has been displaced forwardly, or to the left as viewed in FIG. 1, the latch ring 44 is displaced radially by a spring 52 to dispose abutments 42 opposite rear surface portions 54 and 56 of the closing ring to hold the latter in die-closed position.

The die head is subsequently opened by retraction of the operating ring 48 to cause a bevelled surface 58 to contact a similarly bevelled surface 60 on the latch ring 44, to displace the latter radially to the position shown in FIG. 1, thus permitting the springs 40 to retract the closing ring 32 to the position shown in FIG. 1.

The structure thus far described may be identical with that disclosed and the aforesaid U.S. Pat. No. 2,739,322 to which reference may be had for further details of construction.

In accordance with the present invention the axial position of the latch ring 44 and the closing ring 32 is determined by a latch thrust ring 62 mounted for limited rotary movement and for limited axial sliding movement on the sleeve portion 64 of an adjusting ring 66 adjustably threaded on the shank portion 22 of the head body 20.

The forward face of the thrust ring 62 has a radial groove 68 for the reception of the corresponding portion of the latch ring 44, the latch ring being thus permitted to move laterally between its two operating positions. The thrust ring 62 is positioned on the adjusting ring 66 by three radial pins 70 press-fitted into the thrust ring and extending radially inward into cam slots 72 formed in the adjusting ring. As best shown in FIG. 3, one end of the cam slot 72 is provided with detent portion 74 in which the pins 70 are received when the thrust ring 62 is in operating position. The thrust ring is also securely locked in this position by a latch 76, pivoted as at 78, on the thrust ring and having a tongue 80 adapted to fit in a slot 82 in the sleeve portion of the adjusting ring. The latch is held in locked position by a spring assembly 84 suitably mounted in the thrust ring. Suitable wrench receiving sockets 86 are provided on the thrust ring to facilitate movement of the ring when required.

The adjusting ring 66 is threaded on to the shank 22 of the die head body and is split as at 88, to permit the ring to be selectively clamped in adjusted position by a clamp bolt 90.

When it is desired to replace the chaser holders 28 a suitable tool is inserted in the sockets 86 and the thrust ring 62 is rotated to move the pins 70 out of the detent portion 74 of the cam slot 72, and then to permit the pins 70 to travel to the opposite end of the cam slot under the influence of the opening springs 40. The opening springs 40 will urge the closing ring 32 to dotted line position B carrying with it the latch ring 44 and the operating ring 48. When the closing ring 32 reaches its limit position the chaser holders 28 may be freely withdrawn radially of the die head.

The alternate set of chaser holders with the chasers pre-positioned therein are then fitted into the guide ways 26. To assure proper radial positioning of the chaser holders for subsequent engagement with the tongue and groove of the closing ring 32 a detent assembly 92 is provided in the head portion 24 for engagement with a recess 94 in the chaser holder 28. This construction eliminates the annoying and time consuming task of manually properly pre-positioning the four chaser holders simultaneously which is extremely difficult since the axis of the die head is normally horizontal.

After the new chaser holders have been positioned, the thrust ring is again rotated, and, as the pins 70 travel along the cam slot 72, the springs 40 are compressed. When the pins 70 have been returned to the detent portion 74 in the cam slot, the apparatus is ready for operation. Any necessary adjustments may be made by loosening the clamp bolt 90, rotating the adjusting ring 66 as required, and tightening the clamp bolt.

From the foregoing it will be apparent that the present invention facilitates the changing of chaser holders in minimum time without requiring disassembly of the unit or removal of the unit from the machine with which is associated. Further, the manual manipulation of the parts has been simplified so that the changing operation can be performed even where the die head is relatively inaccessable or where the space around it is severely limited.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The embodiment of the invention in which an exclusive property or privilege is claimed is defined as follows:

1. In a die head in which chaser holders are moved radially on a body member by a control member movable axially of the body member between two limit positions, said chasers being released from said body member upon movement of said control member beyond one limit position to a release position, an adjustment member mounted on said body, said adjustment member having an external support surface, an annular thrust member mounted on said support surface for limited axial and rotary movement thereon, said thrust member being effective to limit movement of said control member, and cooperating cam and cam follower means on said adjustment member and said thrust member for effecting selective movement of said thrust member between a first position for preventing movement of said control member beyond said one limit position, and a second position permitting movement of said control member to said release position.

2. The die head according to claim 1, together with a latch mechanism for releasably locking said thrust member against movement on said adjustable member when said thrust member occupies said first position.

* * * * *